United States Patent [19]

Pollack

[11] 3,835,514
[45] Sept. 17, 1974

[54] METHOD OF MAKING LAMINATED DIFFUSION BONDED BATTERY PLAQUES

[75] Inventor: William Pollack, Pittsburgh, Pa.

[73] Assignee: Westinghouse Electric Corporation, Pittsburgh, Pa.

[22] Filed: Sept. 18, 1973

[21] Appl. No.: 398,349

Related U.S. Application Data

[62] Division of Ser. No. 143,770, May 17, 1971, abandoned.

[52] U.S. Cl.......................... 29/2, 29/419, 29/472.3, 136/34, 136/75
[51] Int. Cl............................................. B23p 13/00
[58] Field of Search .......... 29/419, 471.1, 472.3, 2; 136/33, 34, 35, 75, 36

[56] References Cited
UNITED STATES PATENTS

| 3,262,815 | 7/1966 | Langer et al. | 136/36 |
| 3,266,936 | 8/1966 | Krebs | 136/34 X |
| 3,702,019 | 11/1972 | Pollack | 136/34 X |
| 3,793,700 | 2/1974 | Maikish et al. | 29/419 |

FOREIGN PATENTS OR APPLICATIONS

| 670,498 | 9/1963 | Canada | 136/36 |

*Primary Examiner*—J. Spencer Overholser
*Assistant Examiner*—Robert J. Craig
*Attorney, Agent, or Firm*—D. P. Cillo

[57] ABSTRACT

A laminated, flexible metal fiber electrode plaque is made by (1) providing a first layer of substantially parallel metallic fibers having lengths greater than about 4 inches, (2) placing a second layer of substantially parallel metallic fibers having lengths greater than about 4 inches on top of and contacting the first layer, the second layer having its fibers oriented between 30° and 90° from the fibers of the first layer, (3) placing a third layer of substantially parallel metallic fibers having lengths greater than about 4 inches on top of and contacting the second layer, the third layer having its fibers oriented in the same direction as the fibers of the first layer, (4) metallurgically diffusion bonding the contact points of the fibers between the layers together, to provide, annealed, bonded plaques and bus connectors, (5) coining the annealed, bonded plaque to provide a plaque having a body portion of between 70 and 97 percent porosity and a bus connector portion of up to 70 percent porosity, by pressing the bus connectors into contact with predetermined areas of the plaque and then (6) metallurgically bonding the contact points of the plaque and bus connectors together.

10 Claims, 5 Drawing Figures

METHOD OF MAKING LAMINATED DIFFUSION BONDED BATTERY PLAQUES

CROSS REFERENCE TO RELATED APPLICATIONS

The present application is a divisional application of application U.S. Ser. No. 143,770, filed on May 17, 1971 now abandoned.

BACKGROUND OF THE INVENTION

Electrode plaques for battery cells have been made as cast grid structures, expanded metal or woven wire screens and sintered powder or metal sheets. These structures generally have one of the disadvantages of having poor retention of active components due to large pore structures, low energy density due to small pore volumes or high electrical resistance.

An electrode plaque of diffusion bonded, protective coated, iron base fibers, described in application U.S. Ser. No. 764,527, now abandoned assigned to the assignee of this invention, reduced all of the prior art disadvantages. Other types of metal fiber plaques having reduced resistivity and increased strength and electrical conductivity are desirable however.

It was found that the optimization of battery cells was possible by providing improved electrode plaques through modification and improvement of the method of making metallic fiber skeletons taught by Troy in U.S. Pat. No. 3,127,668. However, not all the parameters disclosed in the Troy patent produce skeletons suitable as the starting point in making electrode plaques. As part of my invention, I have employed long metal fibers and have established critical porosity ranges and laminating bonding sequences and techniques.

SUMMARY OF THE INVENTION

My invention relates to laminated, flexible, diffusion bonded, fiber metal, electrode plaques for use in battery cells such as, for example, nickel-cadmium and nickel-iron systems and methods for making such laminated plaques.

One embodiment of my method provides these laminated plaques by: (1) machining foil, bar stock or wire to provide discrete sheared, hardened, cold worked metal fibers having cross section dimensions of between about 0.0005 to 0.005 inches and a length of between about 4 to 10 inches, (2) uniformly arranging a portion of the dry metal fibers into a substantially parallel array, to form a first layer in a longitudinal direction, (3) uniformly arranging a portion of the dry metal fibers into a substantially parallel array, to form a second layer, and placing the second layer over and contacting the first layer with the fibers of the second layer in a transverse direction, oriented between 30° to 90°, from the first layer, (4) repeating step (2) to form a third layer in a longitudinal direction, and thence adding layers as above to achieve the desired number of laminations, (5) metallurgically bonding the contact points of the fibers in each layer as well as the individual layers together in a non-oxidizing atmosphere such as a vacuum, inert or protective atmosphere at about 800° to 1,300°C., to provide annealed, flexible, bonded laminated plaques and bus connectors. The method may then proceed by: (6) placing the annealed plaque onto the lower platen of a coining die having a flat surface, (7) placing a center platen having a channel pattern cut therethrough on top of the plaque, (8) placing annealed, diffusion bonded, fiber metal, bus connectors into the channels of the center platen, (9) positioning a top platen, with projections matching the channel pattern of the center platen, so that it projects through the channel pattern of the center platen, (10) compressing the platens at a pressure of between about 9,000 to 20,000 psi, to provide a plaque about 70 to 97 percent porous, with bus connection areas matching the channel pattern of the center platen which are up to about 70 percent porous, (11) metallurgically bonding the fiber contact points of the plaque and bus strips together in a non-oxidizing atmosphere such as a vacuum, inert or protective atmosphere at about 800° to 1,300°C. to insure the formation of the maximum number of fiber contact areas and increase mechanical strength, (12) cutting the battery plaque to size and, optionally, (13) attaching a nickel foil tab to the plaque in a coined bus area.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
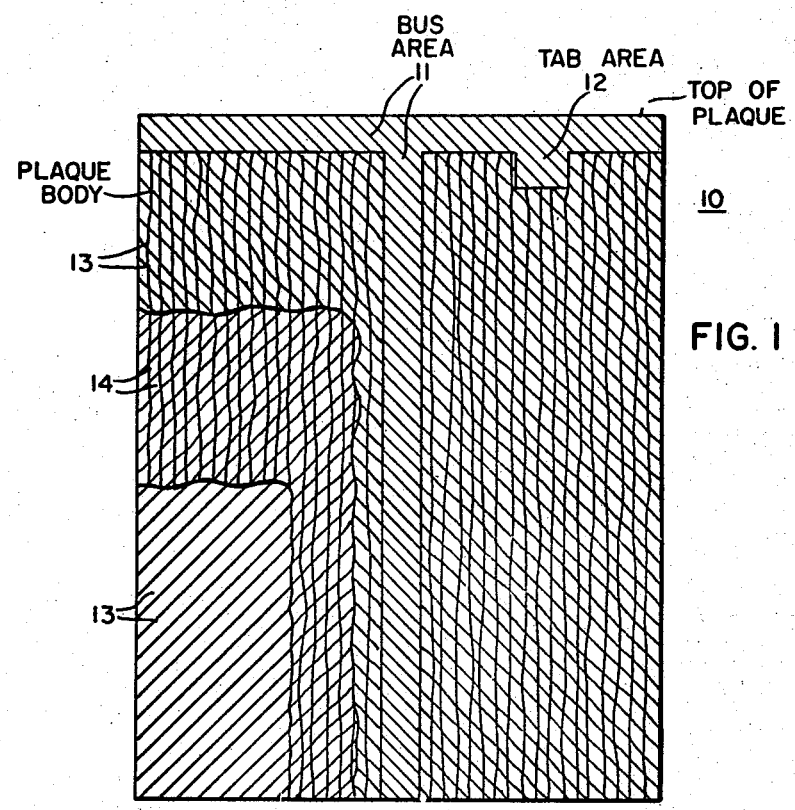
FIG. 1 shows one configuration of our unloaded, laminated electrode plaque which contains a porous body portion and a dense bus connection portion.

Referring to FIG. 1 of the drawings, an electrode plaque 10 comprises a plurality of laminated, diffusion bonded, metallic, fibrous sheets with highly coined bus and tab areas. The plaque is shown in simplified form showing only one fiber array of each layer after diffusion bonding, at great magnification, in FIG. 2. The plaque consists of compacted layers of substantially parallel arrays of fine conductive fibers 20, running in the longitudinal direction and layers of substantially parallel arrays of fibers 21 running at an orientation angle $\theta$ between 30° to 90° from the longitudinal direction of the fibers 20. Only a small fraction of the fibers making up the thickness of the laminations are shown. The fibers are diffusion bonded at their contact points to anneal or soften the fibers and form metal to metal bonds at a multiplicity of crisscross points 22 between adjacent laminations in the plaque and also at points of contact within each lamination. As can be seen, the fibers lie across each other in the longitudinal and transverse directions and so provide a strong yet flexible structure with a very large number of bonded contact points. The outside sheets, front and back sheets of the plaque, will have fibers running longitudinally of the plaque, i.e., lengthwise from top to bottom of the plaque. Active material will be contained in the pore volume 23 between the bonded fibers of the laminations in the loaded battery plaque.

In the process of this invention, the fibers must not be melted together. There must only be an interdiffusion of atoms across the fiber interface. If iron fibers are used, they can be coated, but only after the diffusion bonding step to insure low electrical resistivity in the coated fiber structure. It should be apparent from FIG. 2 and the description herein, that the metal fibers 20 are relatively smooth and even and are essentially free of clefts and protuberances. Also, the plaque consists only of metal fibers into which active material is directly intruded. There are no metal powder particles nor a metal sponge structure.

The flexible fibrous plaque 10 shown in FIG. 1 has a high density bus connector area 11 and tab area 12. A lead tab will generally be connected to the tab area. Both positive and negative battery plaques may be made using this construction. The difference between the positive and negative electrodes resides in the active electrode material applied and the porosity and thickness of the plaques.

If iron fibers are used, the electrical conductivity as well as the electrode characteristics of the bonded fiber plaque may be improved by coating the bonded plaque with an essentially continuous, thin layer, about 0.0001 to 0.001 inches thick, of electrically conductive material. In particular, electrodeposits of metals such as copper, nickel, silver, and cadmium help improve the efficiency and life of the electrode, providing such coating does not constitute an impurity element for the intended electrode system. The choice of coating is determined by the type of battery system in which the plaque is to be used.

In the dry laminating step, metal fibers, preferably nickel fibers, are obtained by machining foil, bar stock, wire, etc., to process shredded, hardened, cold worked fibers of one-half to 5 mil cross section and lengths ranging from about 4 to 10 inches or longer, depending on the limitations of the shredder. These fibers are arranged in substantially parallel arrays to provide a lamination or layer of substantially parallel metal fibers. This can be accomplished manually by combing the fibers or automatically by placing the foil cutter over a moving belt such as paper. When a plurality of layers have been laid out they are stacked, each layer having its substantially parallel array of fibers oriented approximately 30° to 90° to the adjacent layers. The outside layer for each plaque will preferably have a longitudinal fiber orientation of the plaque. The alternate substantially transverse layers will have an orientation angle $\theta$ between 30° to 90° from the longitudinal layers.

Continuous lamination of plaques could use sheets from reels of steel wool rather than layers of shredded nickel foil fibers. A cutter could cut the steel wool sheet into plaque lengths and they could be stacked in longitudinal and transverse layers as above. Also, the longitudinal layer could be stretched out from the reel and transverse layers pulled across and over the longitudinal layer and then cut off to size, after which the longitudinal layer could be advanced the width of the transverse reel and the next transverse section pulled across and over the longitudinal layer and cut to size. In a similar fashion, the transverse layer from the reel could be positioned at an angle to the longitudinal layer and cut off to size as described above. Another approach to continuous lamination could use a longitudinal layer around which is wound a transverse layer positioned 30° to 60° from the longitudinal layer. As the transverse layer is wound around the longitudinal layer, the longitudinal layer is advanced so as to keep transverse sections close to each other, where as shown in FIG. 1, the layer of fibers 13 can be from a steel wool reel wound around the longitudinal layer 14.

Figure 2:
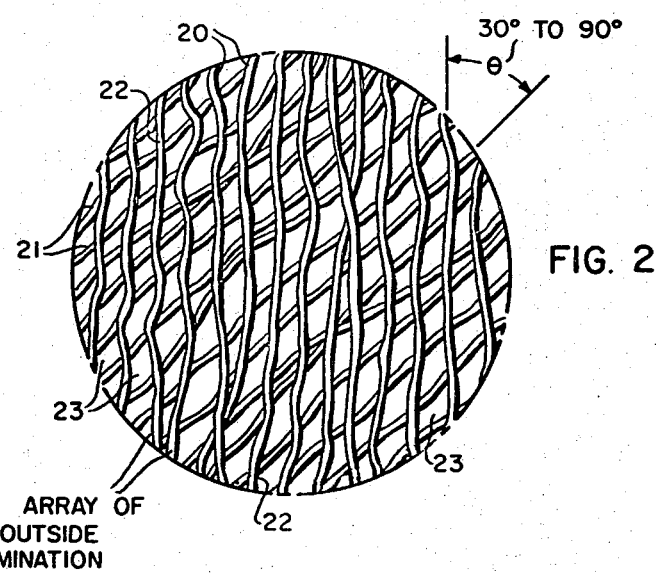
FIG. 2 shows a magnified view of two diffusion bonded metallic fiber arrays, of two lamination layers of the plaque of FIG. 1.

The fiber metal mat and bus connectors made by this dry laminating procedure have to be processed through a diffusion bonding operation in which the fibers in contact are simultaneously annealed or softened and metallurgically solid state bonded. This provides a plurality of bonded, laminated outside and adjacent inside layers. As can be seen in FIG. 2, the crisscrossing of adjacent layers will provide a very strong yet highly flexible structure upon diffusion bonding and will provide excellent electrical conductivity, especially if the orientation between adjacent layers is between about 30° to 60°, the preferred range for $\theta$. This laminated structure is an improvement over unbonded and bonded, substantially unidirectional or randomly oriented fiber plaques. The use of long fibers, at least 4 inches, increases the strength and electrical conductivity in the plaque.

The metal fiber sheets for plaque and bus connectors are stacked onto a metal boat with porous ceramic paper separating each sheet. The boat is then stoked into a furnace maintained between about 800° to 1,300°C. in a nonoxidizing atmosphere. Generally a hydrogen gas atmosphere is used. At these temperatures the fiber contact points in the fiber sheet between crisscrossing fiber arrays and the fibers in each sheet are bonded together. In this process there is no melting but an interdiffusion of metal atoms across the fiber interface, the fibers remaining relatively smooth and not forming melt globules which would reduce the plaque pore volume.

Figure 3:
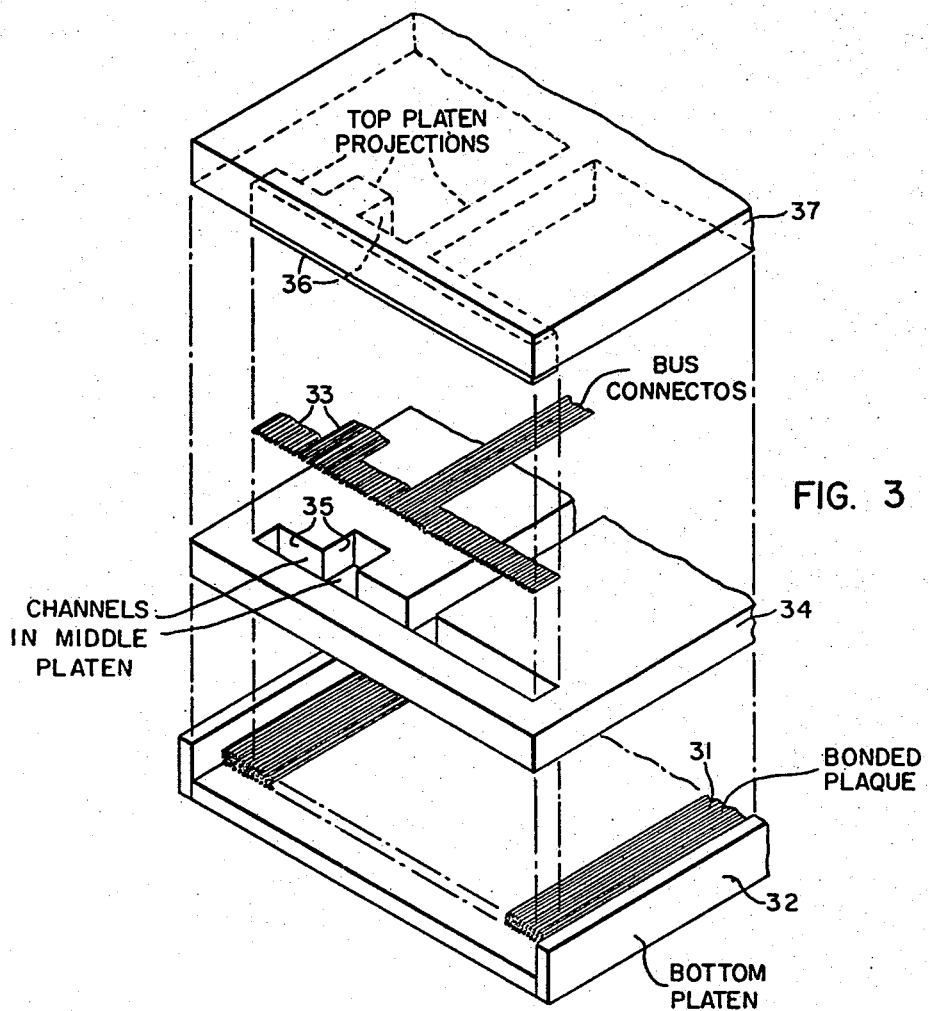
FIG. 3 shows a three-dimensional view of the coining apparatus used to make the laminated electrode plaques of this invention.

The top edge of the bonded plaque is then trimmed in a paper cutter. The annealed plaque 31 is then placed onto the flat, bottom platen 32 of the coining apparatus shown in FIG. 3. The coining apparatus serves a dual function of coining the plaque thickness and pressing the bus connectors 33 and the plaque simultaneously. The lower platen is elevated by a hydraulic pump until the annealed, bonded plaque 31 is in contact with a middle platen 34 having grooves or a channel 35 cut therethrough. This channel pattern will conform to the highly coined bus connector and tab areas that are desired on the plaque. The annealed, bonded bus connectors 33 are inserted into the channel 35 in the middle platen 34. The platens are then elevated until the projections 36 of the top platen 37, which match the channel pattern of the middle platen, are caused to project through the middle platen and cause the bus connectors to contact the plaque. Since the thickness of the projections 36 will be greater than the thickness of the middle platen 34 the projection will move through the channel in the middle platen and coin the plaque to a higher density than will the middle platen. As can be seen in FIG. 3, the top platen projections will slide through and are complementary to the channels is the middle platen. Generally, between about 9,000 to 20,000 psi will be sufficient to coin the plaque. The fiber density in the body of the plaque will generally be between 3 and 30 percent of theoretical density (i.e., 97 and 70 percent porous) whereas the density at the highly coined bus connector and tab areas will be about 50 percent.

Using fiber metal in the bus connection areas insures a maximum of metal contact with a minimum weight per unit area over the length of the bus connection and therefore a reduction in electrical resistivity regardless of plate size. Since electrical resistivities of fiber metal structures increase as density decreases, it is most important that maximum fiber bonds be established and that adequate bus connections be provided in the plaque for electron conduction.

If an attempt is made to coin the low density fiber sheets prior to a first metallurgically diffusion bonding, it will become evident that distortion of the fiber metal structure during the subsequent heat treatment will cause a loss of size control of the plaque. Furthermore, attempts at forming a mechanical bond between the fibers of the plaque and the bus sections will not be successful unless the fibers are in an annealed or softened condition.

The coined bonded plaque, with bus connectors added is then diffusion bonded for the second time under conditions similar to those described above. The second diffusion bonding operation causes additional mechanical fiber contacts, made in the coining operation, to become attached metallurgically. This process step insures the formation of a maximum number of fiber contact areas with resultant reduction in electrical resistivity, as well as increased mechanical strength in the plaque. Whereas the shrinkage in linear dimensions in the first diffusion bonding operation may be approximately 5 percent, it is found that re-diffusion bonding an annealed fiber structure will not result in any apparent shrinkage and therefore maximum dimensional stability is obtained.

The plaque is then trimmed to size by a suitable shearing operation and nickel foil tabs attached to the plaque in the coined tab area by spot welding or the like.

If iron fibers are used from a suitable steel wool product such as steel wool reels rather than the sheared nickel fibers, the plaque can be uniformly plated (about 0.2 mils coating) with nickel, cadmium, copper, or silver at this point. If plating precedes diffusion bonding, the nickel plating and steel base metal form a high resistance nickel-iron alloy during diffusion bonding which results in a high internal resistance and subsequent poor battery properties.

The plaque is now ready for plate manufacture in which suitable active electrode materials such as nickel hydroxide for positive electrodes and zinc hydroxide, cadmium hydroxide or iron hydroxide for negative electrodes can be loaded into the porous plaque by pasting or aqueous slurry techniques. These loaded active electrode plaques can then be used as positive and negative plates in batteries containing a plurality of suitably connected positive and negative plates with separators and electrolyte solution therebetween.

Figure 4:
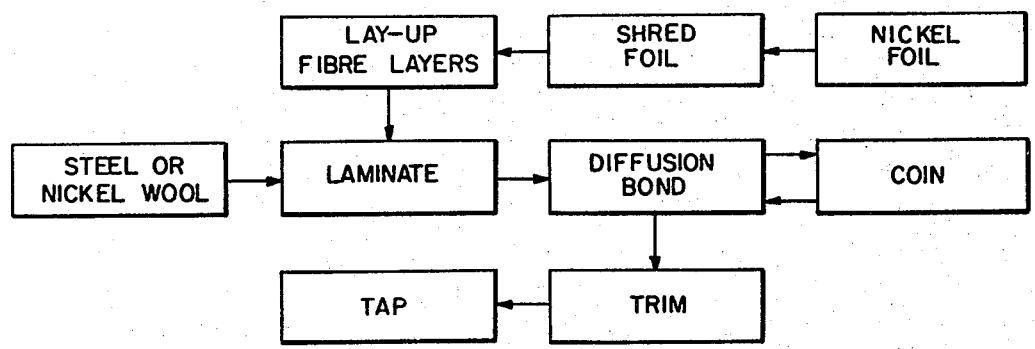
FIG. 4 shows a flow diagram of the method of this invention.

A flow diagram of this manufacturing process is shown as FIG. 4 of the drawings where the fibers are manually oriented and where they are pre-oriented in the form of a suitable commercial wool having the required long fiber length, cross section and substantially parallel fiber array.

Example 1

Nickel fibers were obtained by machining 0.001" electroformed nickel foil in a rotary cutter to process fibers having a cross-section of 0.001 × 0.001 × 6 inches long. As the fibers were cut, they fell from the cutter into a collection box located under the cutter-knife assembly.

Because of the differences in characteristics of the active material for the positive and negative plates of the cell, two battery plaques were produced with different properties, as shown in Table 1 below:

Table 1

|  | Wt. of Fiber (gm) | Porosity (wt %) | Thickness (in.) | No. of Laminates |
|---|---|---|---|---|
| Pos. Plaque | 55 | 86.5 | 0.050 | 5 |
| Neg. Plaque | 33 | 92.5 | 0.050 | 3 |

In the dry laminating process the fibers were arranged in a parallel array in layers, with each layer having its fibers oriented approximately 90° to the layers above and below it. Since fiber spacing is not easily controlled in the manual laminating procedure, the number of fiber layers are arbitrarily based on producing a layer whose weight was some common fraction for either plaque. A weight of 0.17 to 0.19 grams per square inch was used for each layer with five and three layers required for the positive and negative plaques, respectively.

Each layer was produced by distributing about 11 grams of the long nickel fibers uniformly, and in as parallel an array as possible by combing the fibers, onto a paper support having the outline of the plaque to be made with an allowance being made in the area of the plaque for trimming and diffusion bonding shrinkage. Small portions of fibers for each layer were distributed over the plaque area of the papers and fiber clusters or bundles broken up.

The layers for each plaque were then assembled by a laminating technique. A first layer on a paper support was used as the outside, bottom, longitudinal (long direction of the plaque) layer. It was placed onto a ceramic fiber paper, which serves as an insulator-separator in the bonding operation, and the base paper supporting the fibers was very carefully pulled out. A second layer was placed on top of the first layer with its substantially parallel fibers oriented 90° from the fibers of the bottom, longitudinal layer. This formed a crisscross pattern between the adjacent contacting fiber layers. The paper supporting this transverse second layer was carefully pulled out so that the fibers of each layer contacted each other at points where they crisscrossed. The remaining layers for each plaque were stacked in the same manner with each layer having its fibers oriented 90° from the previous layer. The outside (bottom and top) layer for each plaque had a longitudinal fiber orientation. Bus connector layers were made in the same way from a laminated type structure.

The stacked layers for each plaque and the bus connectors supported by ceramic paper were then put onto a stainless steel tray. The tray was passed into the first of three hot zones from the back of a furnace maintained at 1,195°C. ± 10°C. with a hydrogen gas flow of 200 to 250 CFH. The tray remained in the hot zone approximately 45 minutes to anneal and diffusion bond the contacting metal fibers and then was passed to the successive cooler zones of the furnace. The annealed, metallurgically diffusion bonded plaques were then removed from the furnace. The temperature of the furnace hot zone must be maintained such that there is only interdiffusion of metal across the contacting fiber interface. The fibers must not be melted or globules will form reducing pore volume within the plaque.

The top edge of each plaque was trimmed in a paper cutter to provide a 8¾ × 6¾ inches flexible, bonded sheet of about 95 percent porosity (i.e., 5 percent of theoretical density). The bus sheets ere trimmed to sets of ½ × 7⅛, ½ × 9-3/16 inches and 1⅝ × ½ inch sizes. The plaques were then weighed and examined for uniformity of fiber before coining.

The annealed, laminated, diffusion bonded plaque was then placed onto the flat lower platen of the coining apparatus shown in FIG. 3 of the drawings. This apparatus had a middle platen with a channel T-shaped opening through it, as shown in FIG. 3, which corresponded to the bus and tab areas shown in FIG. 1. The top platen of the apparatus had projections of the same shape and area as the openings in the middle platen. These projections fitted through the middle platen channel and were thicker than the middle platen so that when the top and middle platens were in contact and fitted together the projections passed through and extended beyond the middle platen.

The lower platen was elevated by a hydraulic pump until the plaque was in contact with the middle platen. The diffusion bonded bus connectors were doubled up lengthwise and inserted into the grooves in the center platen. The loose and frazzled edges of the bus members were placed in contact with the open structure of the plaque for maximum interlocking of members. The platens were then elevated until the projections in the top platen passed through the grooves in the middle platen and caused the bus connectors to contact the plaque. A pressure of about 18,000 psi was used to compress the flexible fiber metal plaque body to a thickness of 0.05 inches and the bus and tab areas to a thickness of 0.025 to 0.03 inches. The fiber porosity in the plaque body for the postive and negative plaques was about 86.5 percent and 92.5 percent, respectively, as compared to the density in the bus and tab areas of about 50 percent of theoretical. Attempts at forming a mechanical bond between the fibers of the plaque and the bus sections will not be successful unless the fibers are in an annealed or softened condition. The coining operation of diffusion bonded plaque and bus sections meets this condition.

The coined plaque was diffusion bonded a second time under the same conditions as described above. The second diffusion bonding operation caused additional mechanical fiber contacts, made in the coining operation, to become attached through metal to metal diffusion and insured maximum fiber contact, increased mechanical strength and reduced electrical resistivity.

The diffusion bonded plaque was then trimmed to size with a paper cutter and a solid nickel foil tab attached to the plaque in the coined tab area by 25 spot welds arranged in five rows of five welds.

Figure 5:
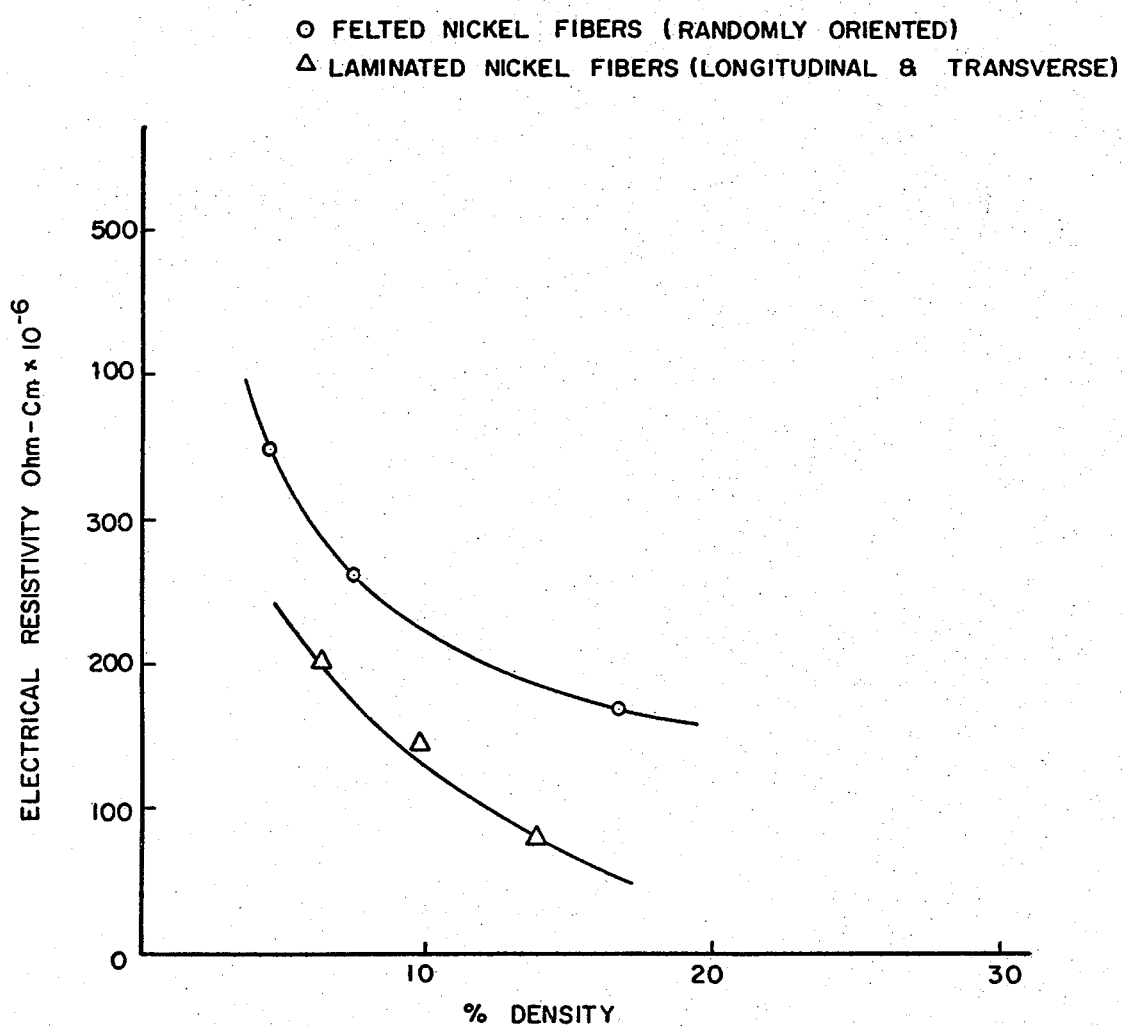
FIG. 5 is a graph, showing electrical resistivity of different electrode plaques as a function of plaque density and fiber orientation.

Using the process described above, battery plaques have been produced with electrical resistivities of below 90 micro ohm-cm at 15 percent theoretical density. FIG. 5 shows a graph of plaque density vs. electrical resistivity for diffusion bonded nickel plaques produced by this method as compared to felted, diffusion bonded, randomly oriented nickel fiber plaques. The electrical resistivities of the fiber metal structure will increase as the density of the structure decreases and it is most important that the maximum fiber bonds be established and that adequate busing be provided in the plate for electron conduction.

I claim as my invention:

1. A method of producing strong, flexible, porous, bonded, laminated electrode plaques comprising a body portion consisting of bonded metal fibers free of metal protuberances, comprising the steps of:

A. laying a sheet of a plurality of layers, each layer consisting of substantially parallel metal fibers having lengths greater than about 4 inches and cross sections between about ½ to 5 mil, each layer contacting adjacent layers each layer having its fibers oriented between 30° and 90° from the fibers of adjacent layers, B. heating the layered sheet below the melting point of the metal fibers in a non-oxidizing atmosphere, to metallurigcally solid state bond together the contact points of the fibers within each layer and the fibers of adjacent layers to form an unmelted bond of diffused metal between the fibers at points of contact, and provide a bonded, laminated plaque of softened fibers free of melt protuberances, C. coining the bonded, laminated plaque while the fibers are in a softened condition, to establish additional fiber contacts and to provide a plaque having a body portion of between 70 and 97 percent porosity, D. re-heating the coined, bonded, laminated plaque below the melting point of the metal fibers in a non-oxidizing atmosphere, to metallurgically solid state bond together the additional fiber contact points established during coining, to form an unmelted bond of diffused metal between the fibers at points of contact, and provide an unoxidized bonded, laminated electrode plaque of bonded, metal fibers free of melt protuberances.

2. The method of claim 1, wherein the non-oxidizing atmosphere comprises hydrogen gas, the bonding is performed at a temperature between about 800° to 1,300°C and a bus connector and a nickel tab are attached to the electrode.

3. A method of producing strong, flexible, porous, bonded, laminated electrode plaques comprising a body portion consisting of bonded metal fibers free of melt protuberances, comprising the steps of:

A. laying a sheet of a plurality of layers each layer consisting of substantially parallel metal fibers selected from the group consisting of iron and steel, having lengths greater than about 4 inches and cross sections between about ½ to 5 mil, each layer contacting adjacent layers each layer having its fibers oriented between 30° and 90° from the fibers of adjacent layers, B. heating the layered sheet below the melting point of the fibers in a reducing atmosphere comprising hydrogen gas, to metallurgically solid state bond together the contact points of the fibers within each layer and the fibers of adjacent layers, to form an unmelted bond of diffused metal between the fibers at points of contact, and provide a bonded, laminated plaque of softened fibers free of melt protuberances, and then C. coining the bonded, laminated plaque while the fibers are in a softened condition, to establish additional fiber contacts and provide a plaque having a body portion of between 70 and 97 percent porosity, and then D. attaching bus connectors to predetermined areas of the bonded, laminated plaque to provide a plaque having a body portion of between 70 and 97 percent porosity and a bus connector portion, and then E. re-heating the bonded, laminated plaque below the melting point of the fibers in a reducing atmosphere comprising hydrogen gas, to metallurgically solid state bond together the additional fiber contact points established during coining, to form an unmelted bond of diffused metal between the fibers at points of contact and more firmly attach the bus connectors and provide an unoxidized bonded, laminated electrode plaque of bonded metal fibers free of melt protuberances suitable for coating, and the F. coating the bonded, laminated plaque with a metal coating selected from the group consisting of nickel, cadmuim, copper, and silver, having a thickness from about 0.1 to 1 mil.

4. The method of claim 3 wherein the bus connector portion is up to about 50 percent porous.

5. The method of claim 3, wherein a nickel tab is attached to the plaque and the bonding of the fibers is performed at a temperature between about 800° to 1,300°C.

6. The method of claim 3, wherein the metal fibers have lengths from about 4 to 10 inches and the outside layers of the laminated plaque are oriented in the longitudinal direction of the plaque.

7. The method of claim 3, wherein in step (A), layers are wound around a first layer, said wound layers having their fibers oriented between 30° and 90° from the fibers of the first layer.

8. The method of claim 3, wherein, in step (D), bus connectors are pressed into the plaque by
  i. placing the laminated bonded plaque on top of a flat bottom platen,
  ii. placing a middle platen on top of the laminated bonded plaque, said middle platen having a predetermined channel cut therethrough,
  iii. placing bus connectors in the middle platen channel,
  iv. placing a top platen on top of the middle platen, said top platen having projections which slide through the channel cut through the middle platen and project through the middle platen to cause the bus connectors to contact the plaque and
  v. pressing the top and bottom platens together.

9. A method of producing strong, flexible, porous, bonded, laminated electrode plaques comprising a body portion consisting of bonded metal fibers free of melt protuberances, comprising the steps of:

A. providing a first layer comprising substantially parallel metal fibers selected from the group consisting of iron and steel and winding a plurality of layers around the first layer, said wound layers consisting of substantially parallel metal fibers selected from the group consisting of iron and steel, having cross sections between about ½ to 5 mil, said wound layers having their fibers oriented between 30° and 90° from the fibers of the first layer, B. heating the layered sheet below the melting point of the fibers in a reducing atmosphere comprising hydrogen gas, to metallurgically solid state bond together the contact points of the fibers within each layer and the fibers of adjacent layers, to form an unmelted bond of diffused metal between the fibers at points of contact, and provide a bonded, laminated plaque of softened fibers free of melt protuberances, and then C. coining the bonded, laminated plaque while the fibers are in a softened condition, to establish additional fiber contacts and provide a plaque having a body portion of between 70 and 97 percent porosity, and then D. attaching bus connectors to predetermined areas of the bonded, laminated plaque to provide a plaque having a body portion of between 70 and 97 percent porosity and a bus connector portion, and then E. re-heating the bonded, laminated plaque below the melting point of the fibers in a reducing atmosphere comprising hydrogen gas, to metallurgically solid state bond together the additional fiber contact points established during coining, to form an unmelted bond of diffused metal between the fibers at points of contact and more firmly attach the bus connectors and provide an unoxidized bonded, laminated electrode plaque of bonded metal fibers free of melt protuberances suitable for coating, and then F. coating the bonded, laminated plaque with a metal coating selected from the group consisting of nickel, cadmium, copper, and silver, having a thickness from about 0.1 to 1 mil.

10. The method of claim 9 wherein each layer has its fibers oriented between 30° and 90° from the fibers of adjacent layers, the bus connector portion is up to about 50 percent porous and a nickel tab is attached to the plaque.

* * * * *